United States Patent
Suh

(10) Patent No.: US 7,830,767 B2
(45) Date of Patent: Nov. 9, 2010

(54) RECORDING MEDIUM, AND METHOD AND APPARATUS FOR RECORDING/REPRODUCING DATA IN/FROM THE RECORDING MEDIUM

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 750 days.

(21) Appl. No.: 11/477,559

(22) Filed: Jun. 30, 2006

(65) Prior Publication Data

US 2007/0002699 A1 Jan. 4, 2007

Related U.S. Application Data

(60) Provisional application No. 60/695,003, filed on Jun. 30, 2005.

(30) Foreign Application Priority Data

Nov. 8, 2005 (KR) .................. 10-2005-0106706

(51) Int. Cl.
*G11B 7/00* (2006.01)
(52) U.S. Cl. ............... 369/59.25; 369/94; 369/275.3
(58) Field of Classification Search ............... None
See application file for complete search history.

(56) References Cited

U.S. PATENT DOCUMENTS

| | | | | |
|---|---|---|---|---|
| 6,072,759 A * | 6/2000 | Maeda et al. | ............ | 369/59.25 |
| 6,320,840 B1 * | 11/2001 | Oh et al. | ............ | 369/286 |
| 7,151,729 B1 * | 12/2006 | Park et al. | ............ | 369/53.2 |
| 7,209,431 B2 * | 4/2007 | Mons et al. | ............ | 369/275.3 |
| 2003/0137915 A1 * | 7/2003 | Shoji et al. | ............ | 369/59.25 |
| 2004/0037197 A1 * | 2/2004 | Fujiune et al. | ............ | 369/53.22 |
| 2004/0085877 A1 * | 5/2004 | Lee et al. | ............ | 369/53.37 |
| 2004/0156294 A1 * | 8/2004 | Watanabe et al. | ............ | 369/94 |
| 2005/0036425 A1 | 2/2005 | Suh et al. | | |
| 2005/0111281 A1 * | 5/2005 | Kato et al. | ............ | 365/222 |
| 2005/0207293 A1 * | 9/2005 | Kim | ............ | 369/47.22 |
| 2006/0179448 A1 * | 8/2006 | Smith et al. | ............ | 720/718 |
| 2007/0206481 A1 * | 9/2007 | Stallinga et al. | ............ | 369/112.23 |
| 2008/0107010 A1 * | 5/2008 | Town | ............ | 369/283 |
| 2009/0245064 A1 * | 10/2009 | Heemskerk | ............ | 369/94 |

FOREIGN PATENT DOCUMENTS

| | | |
|---|---|---|
| CN | 1321971 | 11/2001 |
| WO | WO 00/07186 | 2/2000 |
| WO | WO 2005/004134 A1 | 1/2005 |
| WO | WO 2005/004138 A1 | 1/2005 |

OTHER PUBLICATIONS

International Search Report dated Sep. 1, 2006.
Office Action by Chinese Patent Office dated May 19, 2010 for Application No. 2006-80023936.X.

* cited by examiner

*Primary Examiner*—Wayne R Young
*Assistant Examiner*—Brian Butcher
(74) *Attorney, Agent, or Firm*—Harness, Dickey & Pierce, P.L.C.

(57) ABSTRACT

A recording medium, and a method and apparatus for recording/reproducing data in/from the recording medium are disclosed. The recording medium includes one or more recording layers, and a management area including management information, wherein the management information includes specific information indicating a presence of different format and type of recording layer in the recording medium. The management area is located at a specific recording layer. The format represents a different category in a recording layer and the type is classified by read-only or writable in a recording layer.

31 Claims, 7 Drawing Sheets

| Byte position | Content | Number of bytes |
|---|---|---|
| 0 | Disc Information identifier="DI" | 2 |
| 4 | BD-BD Hybrid Disc Type 1 identifier | 1 |
| 7 | BD-BD Hybrid Disc Type 2 identifier | 1 |
| 13 | Hybrid Disc identifier/Channel bit length | 1 |
| 15 | Number of Total layer | 1 |
| 16 | BCA descriptor | 1 |

BD/BD Hybrid

BD/DVD Hybrid

FIG. 2B

| Byte position | Content | Number of bytes |
|---|---|---|
| 0 | Disc Information identifier="DI" | 2 |
| 4 | BD-BD Hybrid Disc Type 1 identifier | 1 |
| 7 | BD-BD Hybrid Disc Type 2 identifier | 1 |
| 13 | Hybrid Disc identifier/Channel bit length | 1 |
| 15 | Number of Total layer | 1 |
| 16 | BCA descriptor | 1 |

RECORDING MEDIUM, AND METHOD AND APPARATUS FOR RECORDING/REPRODUCING DATA IN/FROM THE RECORDING MEDIUM

This application claims the benefit of Korean Patent Application No. 10-2005-0106706, filed on Nov. 8, 2005, which is hereby incorporated by reference as if fully set forth herein.

This application claims the benefit of U.S. Provisional Application No. 60/695,003, filed on Jun. 30, 2005, in the name of inventor Sang Woon SUH, entitled "METHOD OF DISCRIMINATING DISC TYPE BETWEEN THE HYBRID DISC", which is hereby incorporated by reference as if fully set forth herein.

BACKGROUND OF THE INVENTION

1. Field of the Invention

The present invention relates to a recording medium, and more particularly to a physical structure efficiently used when manufacturing the recording medium, and a method and apparatus for recording/reproducing data in/from the recording medium using the physical structure.

2. Discussion of the Related Art

Generally, with the increasing development of the recording capacity technologies, there have been widely used discs (e.g., CDs and DVDs) acting as recording mediums capable of recording a large amount of data therein.

Particularly, there has recently been developed a high-density optical recording medium capable of recording/storing high-quality video data and high-quality audio data for a long period of time, for example, a Blu-ray Disc (BD) acting as the next-generation recording medium.

The BD (Blu-ray Disc) based on the next-generation recording medium technique has been considered to be the next-generation optical recording solution capable of storing much more data than a conventional DVD. In recent times, many developers have conducted intensive research into the international standard technical specification associated with the BD along with those of other digital devices.

Presently, the CD-associated technique, the DVD-associated technique, and the next-generation recording medium technologies are combined with each other, such that the combined technologies are widely used throughout the world. Therefore, there is a need for the above-mentioned combined technologies to be available for a single disc, such that hybrid discs are recently developed to solve the above-mentioned problem.

Also, the recording medium technology has been gradually developed in the order of the CD-associated technique→the DVD-associated technique→the next-generation recording medium technology. Presently, all of the CDs, the DVDs, and the next-generation recording mediums are widely used throughout the world. Recently, some users or developers have attempted to use a single recording medium as a hybrid disc.

However, the hybrid-disc international standard has not yet been completed, such that many limitations and problems occur in developing the above-mentioned hybrid disc. In other words, it is difficult to recognize the method and structure for distinguishing the hybrid disc from others, such that many limitations and problems occur in implementing a method and apparatus for recording/reproducing data in/from the hybrid disc.

SUMMARY OF THE INVENTION

Accordingly, the present invention is directed to a recording medium, and a method and apparatus for recording/reproducing data in the recording medium that substantially obviate one or more problems due to limitations and disadvantages of the related art.

An object of the present invention is to provide a method for discriminating a hybrid disc.

Another object of the present invention is to provide a method and apparatus for reproducing data from a recording medium having a method for discriminating a hybrid disc, or a method and apparatus for recording data in the recording medium having the method for discriminating the hybrid disc.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium comprises: one or more recording layers, and a management area including management information, wherein the management information includes specific information indicating a presence of different format and type of recording layer in the recording medium. The management area is located at a specific recording layer. The format represents a different category in a recording layer and the type is classified by read-only or writable in a recording layer.

In another aspect of the present invention, there is provided a method for reproducing data from a recording medium comprising the steps of: a) reading management information indicating a presence of different format and type of the recording layer in the recording medium from a management area of the recording medium, wherein the management information is located at a specific layer of the recording medium, wherein the format represents a different category in a recording layer and the type is classified by read-only or writable in a recording layer; b) checking whether the recording medium includes the different format and type in a recording layer based on the management information; and c) determining a reproducing mode to reproduce data from the different format and type of recording layer as a result of the step b).

In yet another aspect of the present invention, there is provided a method for recording data in a recording medium comprising the steps of: a) reading management information indicating a presence of different format and type of the recording layer in the recording medium from a management area of the recording medium, wherein the management information is located at a specific layer of the recording medium, wherein the format represents a different category in a recording layer and the type is classified by read-only or writable in a recording layer; b) checking whether the recording medium includes the different format and type in a recording layer based on the management information; and c) determining a recording mode to record data from the different format and type of recording layer as a result of the step b).

In yet, another aspect of the present invention, there is provided an apparatus for reproducing data from a recording medium comprising: a control unit checking whether the recording medium includes a different format and type in a recording layer based on a management information, the management information indicating a presence of different format and type of the recording layer in the recording medium, wherein the format represents a different category in a recording layer and the type is classified by read-only or writable in a recording layer, and determining a reproducing mode to reproduce data from the different format and type of recording layer; and a processor processing data according to the determined reproducing mode.

In yet another aspect of the present invention, there is provided an apparatus for recording data in a recording medium comprising: a control unit checking whether the recording medium includes a different format and type in a recording layer based on a management information, the management information indicating a presence of different format and type of the recording layer in the recording medium, wherein the format represents a different category in a recording layer and the type is classified by read-only or writable in a recording layer, and determining a recording mode to record data from the different format and type of recording layer; and a processor processing data according to the determined record mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2B exemplarily shows hybrid disc information recorded in DI (disc information) according to the present invention;

DETAILED DESCRIPTION OF THE INVENTION

Figure 1A:
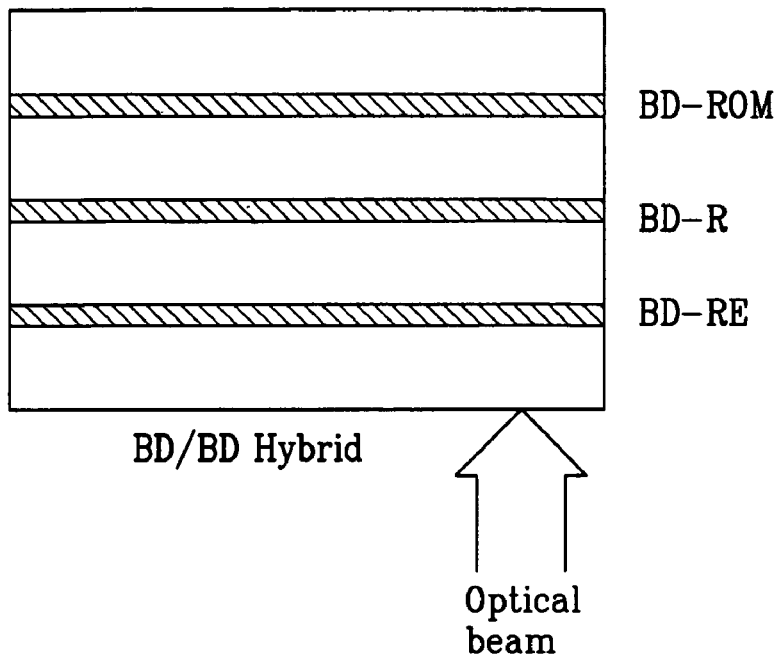
FIG. 1A is a hybrid disc composed of a single format according to the present invention.

Reference will now be made in detail to the preferred embodiments of the present invention, examples of which are illustrated in the accompanying drawings. Wherever possible, the same reference numbers will be used throughout the drawings to refer to the same or like parts.

A recording medium, and a method and apparatus for recording/reproducing data in/from the recording medium according to the present invention will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

The term "recording medium" for use in the present invention indicates all mediums capable of storing data therein according to various recording schemes. For example, the recording medium includes one or more BD recording layers. Representative examples of the recording medium are a disc, and a magnetic tape, etc.

In association with the present invention, the term "format" is indicative of a format of a disc, data of which is recorded or reproduced according to unique schemes. Also, the format may represent a different category in a recoding layer. For example, the above-mentioned format may be based on a BD, a DVD, or a CD, however, it should be noted that the scope of the present invention is not limited to the above-mentioned examples, and can be applied to other examples as necessary.

The term "type" is indicative of a distinction between data recording/reproducing method of the above-mentioned formats (i.e., BD, CD, and DVD, etc). For example, if the specific information indicates the presence of same type of recording layer, the BD may be classified into a BD-ROM (Read Only Memory) type, a BD-R (Recordable) type, and a BD-RE (Rewritable). The CD may be classified into a CD-ROM (Read Only Memory) type, a CD-R (Recordable) type, and a CD-RW (Rewritable) type. Also, the DVD may be classified into a DVD-ROM (Read Only Memory) type, a DVD Write once type, and a DVD Rewritable.

In association with the above-mentioned description, firstly, the term "hybrid disc" is indicative of a single disc composed of only single format. Secondly, the term "hybrid disc" is indicative of a specific disc composed of several formats. In this case, the above-mentioned format includes a plurality of layers having different types. Thirdly, the term "hybrid disc" is indicative of a specific disc formed by the combination of the above-mentioned first and second cases.

The term "Multi-layer" is indicative of at least two layers. Specifically, if a multi-layer includes two layers, this configuration is referred to as a dual-layer.

A recording medium associated with the above-mentioned method for discriminating the hybrid disc, and a method and apparatus for recording/reproducing data in the recording medium will hereinafter be described with reference to the annexed drawings.

For the convenience of description and better understanding of the present invention, the disc, such as a BD hybrid disc, will hereinafter be exemplarily used as the above-mentioned recording medium in the present invention. It should be noted that technical ideas of the present invention can be applied to other recording mediums without departing from the scope and spirit of the invention.

The present invention relates to the hybrid disc technologies, and many developers have conducted intensive research into the international standard technical specification associated with the hybrid disc.

As described above, the hybrid disc is classified into a first hybrid disc composed of a single format and a second hybrid disc composed of several formats.

Figure 1B:
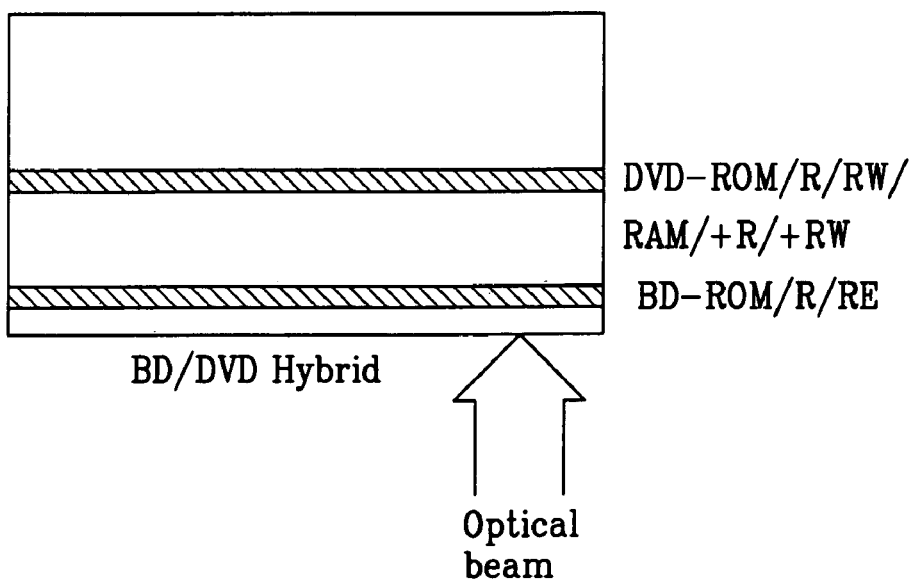
FIGS. 1B~1D are examples of a hybrid disc composed of several formats according to the present invention.
Figure 1C:
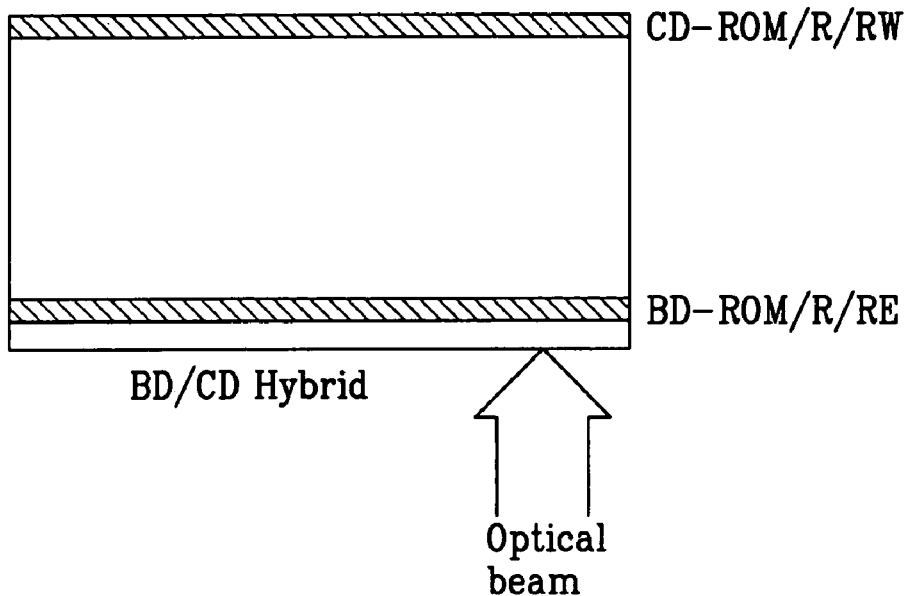
Figure 1D:
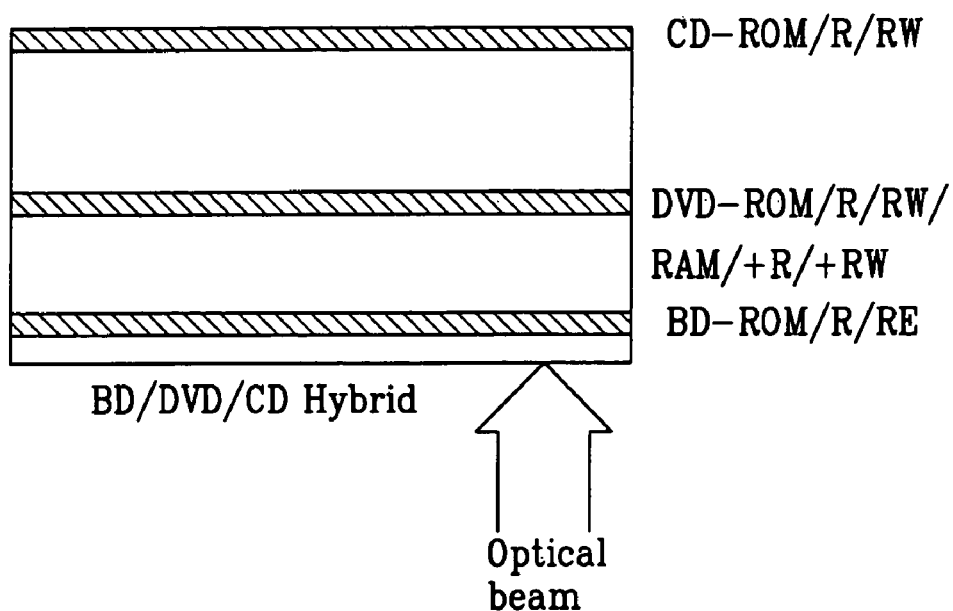

FIG. 1A is a hybrid disc composed of a single format according to the present invention. FIGS. 1B~1D are examples of a hybrid disc composed of several formats according to the present invention.

FIG. 1A shows a hybrid disc composed of a single format from among a plurality of formats. In this case, the BD will be exemplarily used as the above-mentioned format.

It is assumed that the BD-BD hybrid disc shown in FIG. 1A is a multi-layered structure, because the single-layered structure cannot configure the above-mentioned hybrid disc.

In association with the above-mentioned description, there are three types in the above-mentioned BD format, i.e., a BD-ROM type, a BD-R type, and a BD-RE type. Therefore, in order to configure the BD-BD hybrid disc, at least two layers must be contained in the BD-BD hybrid disc, and at least two types of the three BD-format types must be contained in the layer of the BD-BD hybrid disc.

The hybrid disc shown in FIG. 1A includes three layers, and the three layers have different types from each other.

As can be seen from FIG. 1A, an optical beam is received from a lower part to an upper part. For example, if N layers are contained in the disc, the layers are sequentially arranged in the order of a first layer (Layer 0, "L0"), a second layer (layer 1, "L1"), ... an N-th layer (Layer N-1, "Ln-1") on the basis of a specific layer mostly distant from an incident direction of an optical beam.

Needless to say, the above-mentioned layers may also be sequentially arranged on the basis of a specific layer closest to the optical beam incident direction, and the scope of the present invention is not limited to the above-mentioned examples.

The BD-BD hybrid disc shown in FIG. 1A includes a BD-ROM type, a BD-R type, and a BD-RE type. The BD-ROM type is located at the L0 layer, the BD-R type is located at the L1 layer, and the BD-RE type is located at the L2 layer.

Individual layers types of FIG. 1A can be freely defined. The BD can include a maximum of 8 layers. If the 8 layers are contained in the BD, the above-mentioned three types may be repeated in the layers of the disc.

FIGS. 1B~1D show the hybrid disc composed of several formats, differently from FIG. 1A.

Each format may include a plurality of layers as shown in FIGS. 1B~1D. The individual layers may have different types. In other words, different hybrid discs may be configured according to individual formats shown in FIGS. 1B~1D.

Therefore, FIGS. 1B~1D may also include another hybrid structure formed by the repeated uses of the above-mentioned hybrid disc concept.

FIG. 1B shows an example of a BD/DVD hybrid disc. Referring to FIG. 1B, a BD-ROM/R/RE (hereinafter referred to as a BD format) is located at the nearest layer on the basis of an optical-beam incident surface, and the DVD-ROM/R/RE/RAM/+R/+RE (hereinafter referred to as a DVD format) is located at the center layer of the above-mentioned BD/DVD hybrid disc.

FIG. 1C shows an example of a BD/CD hybrid disc. Referring to FIG. 1C, the BD-format is located at the nearest layer on the basis of an optical-beam incident surface, and a CD-ROM/R/RE (hereinafter referred to as a CD format) is located at the most distant layer from the optical-beam incident surface.

FIG. 1D shows an example of a BD/DVD/CD hybrid disc. Referring to FIG. 1D, the BD format is located at the nearest layer on the basis of an optical-beam incident surface, a CD format is located at the most distant layer from the optical-beam incident surface, and the DVD format is located at the center part of the BD format and the CD format.

FIGS. 1A~1D show the above-mentioned three hybrid discs, respectively. In this case, the hybrid disc is used as an example. The above-mentioned hybrid disc is configured due to locations or characteristics of the record areas of the above-mentioned formats or types.

Referring to FIGS. 1A to 1D, it can be recognized that locations of the record areas of individual formats are distinguished from each other. On the basis of the optical-beam incident surface, the BD layer is located at about 0.1 mm, the DVD (or HD-DVD) layer is located at about 0.6 mm, and the CD layer is located at about 1.2 mm.

Therefore, layers of the above-mentioned formats are located at different locations, such that the hybrid disc can be configured. In other words, a BD, a DVD, and a CD having different formats may exist in a single disc. In this case, record area locations of the individual formats are different from each other, such that data of the disc can be recorded or reproduced even if the above-mentioned formats are simultaneously implemented in a single disc.

In association with the above-mentioned description, if the hybrid disc is implemented as shown in FIGS. 1A~1D, the optical recording/reproducing device must correctly recognize whether a current disc is a hybrid disc, and must correctly recognize the configuration of the disc.

As described above, the present invention provides a recording medium including a method for determining whether a current disc is a hybrid disc and recognizing the configuration of the determined disc.

In other words, the present invention provides a method for determining whether a disc is a hybrid disc, and recognizing the configuration of the hybrid disc if the disc is determined to be the hybrid disc. In this case, the above-mentioned configuration is indicative of format and type contained in the hybrid disc.

In order to implement the above-mentioned purposes, the present invention provides a method for recording information of the number of layers contained in at least one format of the disc, recording type of the layers, and discriminating the hybrid disc on the basis of the recorded information.

For example, the hybrid disc composed of several formats as shown in FIGS. 1B~1D provides not only information indicating the number of layers contained in each format, but also corresponding type of the layers.

In order to record/reproduce data in/from the hybrid disc, the optical recording/reproducing device must determine whether the disc is a hybrid disc, and must also recognize format and/or type of the determined hybrid disc.

In addition, if the number of information pieces indicating the number of layers of individual formats is a plural number, there is a need to recognize type of the individual layers, such that the optical recording/reproducing device can record/reproduce data of the disc on the basis of the recognized type.

In association with the above-mentioned description, a plurality of information pieces capable of discriminating the hybrid disc are recorded in a management area. For the convenience of description, an exemplary case in which the disc information (DI) of the PIC area is used as the above-mentioned management area will be described.

Figure 2A:
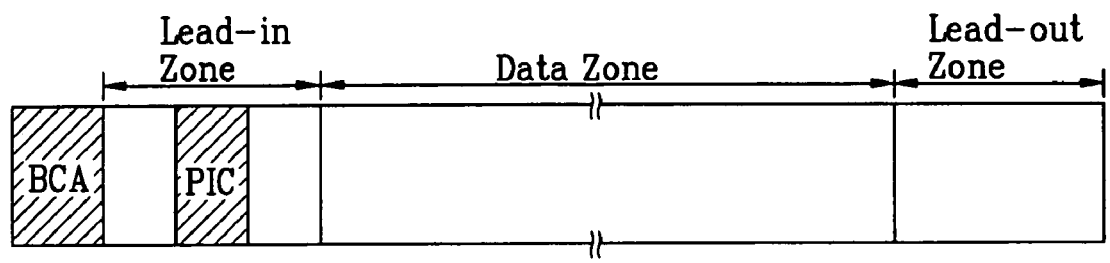
FIG. 2A is a structural diagram illustrating a recording medium according to the present invention.

FIG. 2A is a structural diagram illustrating a recording medium according to the present invention.

Referring to FIG. 2A, the recording medium includes a BCA area, a lead-in zone, a data zone, and a lead-out zone.

The present invention can discriminate the hybrid disc using management information in the management area contained in the recording medium. For example, the management area is located at a lower portion among several recording layers. The BCA area, or the PIC (Permanent Information & Control Data) area of the lead-in zone may be used as the above-mentioned management area.

For the convenience of description, the present invention will describe a specific case in which the BCA zone is used as the above-mentioned management area. In this case, the DI (Disc Information) of the PIC area will be used as the management area for the better understanding of the present invention.

FIG. 2B exemplarily shows hybrid disc information recorded in DI (disc information) according to the present invention.

Referring to FIG. 2B, the DI includes a first part indicating a byte position, a second part indicating content data corresponding to the byte position, and a third part indicating number of bytes assigned to express the content data.

The byte position "0" field is "Disc Information Identifier="DI"" content data. Two bytes are assigned for the above-mentioned content data. The above-mentioned field indicates whether data associated with the DI is loaded or not.

The byte position "4" field is "BD-BD hybrid Disc Type 1 Identifier" content data. A single byte is assigned for the above-mentioned content data. If the disc is determined to be the BD-BD hybrid disc, the above-mentioned field indicates type of individual layers of the BD-BD hybrid disc using the assigned 1 byte.

In this case, a maximum of 8 layers may be assigned to the BD, such that each bit contained in the 1 byte is assigned for a single layer. For example, a Most Significant Bit (MSB) "b7" indicates type of the L7 layer, and a "b0" bit indicates type of the L0 layer.

If the bits b7~b0 are indicated by the above-mentioned method, the number of layers contained in the hybrid disc can be recognized, and type of each layer can also be expressed. In this case, if the number of the above-mentioned layers is not equal to "8", a bit of a corresponding layer is set to "0".

In this case, each bit of the field can be denoted by only two binary values "0" and "1". The above-mentioned field is classified into a BD-ROM type, a BD-R type, and a BD-RE type according to specific information indicating whether data can be recorded or not, such that the BD types can be distinguished by referring to the above-mentioned field.

However, there are three types (i.e., a BD-ROM type, a BD-R type, and a BD-RE type) in the BD, such that it is difficult to correctly express the above-mentioned three types of the BD using the above-mentioned bits.

If any one of the above-mentioned bits is "1", the BD is determined to be the BD-R/RE types, such that it is impossible to discriminate between the BD-R type and the BD-RE type using only the above-mentioned bit information.

In association with the above-mentioned description, the byte position "7" field is "BD-BD Hybrid Disc Type 2 Identifier" content data, and 1 byte is assigned for the above-mentioned content data.

The above-mentioned field is detailed information of the byte position "4", field. If any one of bits contained in the byte position "4" field is "1", i.e., if the BD is determined to be the BD-R/RE types, detailed information associated with corresponding bit layers are defined to discriminate between the BD-R type and the BD-RE type. In this case, 1 byte of the above-mentioned byte position "7" field is assigned and defined for the distinction of the BD-R type and the BD-RE type.

In this case, for example, individual bits of the byte position "7" field are matched with those of the byte position "4" field. In other words, "b3" of the byte position "4" field is the same as "b3" of the byte position "7" field, such that the above-mentioned two "b3" data indicates the same layer information.

In association with the above-mentioned description, if any one of bits contained in the byte position "7" field is "0", the BD is determined to be the BD-R type. If any one of bits contained in the byte position "7" field is "1", the BD is determined to be the BD-RE type.

Therefore, corresponding types of individual layers contained in the above-mentioned BD-BD hybrid disc can be correctly expressed using information of the above-mentioned byte position "4" and 7" fields.

In brief, if the "b3" bit of the byte position "4" field is "1", it can be recognized that the L3 layer indicated by the "b3" bit is a recordable type (i.e., BD R-type or BD-RE type).

However, it is impossible to discriminate between the BD-R type and the BD-RE type using only the above-mentioned information, such that the remaining type of the above-mentioned byte position "7" field is defined. In other words, if the "b3" bit of the byte position "7" field is "0", the BD-R type is determined. If the "b3" bit of the byte position "7" field is "1", the BD-RE type is determined.

In association with the above-mentioned description, the DI (Disc Information) is inserted into a corresponding layer on the condition that the BD is determined to be the BD-RE type. However, if a plurality of layers are contained in the BD-R type or the BD-ROM type, the DI is inserted into only the L0 layer.

Therefore, if the BD-R type or the BD-ROM type is located at other layers instead of the L0 layer of the hybrid disc, it is impossible to recognize the above-mentioned type. Under this situation, the present invention can correctly express the above-mentioned type.

The byte position "13" field is "Hybrid Disc Identifier/Channel bit length" content data, and 1 byte is assigned for the above-mentioned content data. The above-mentioned field indicates that information of the hybrid disc has been contained in the DI and channel bit length information has also been contained in the DI.

The content data of the byte position "13" field indicates whether the disc is a hybrid disc. If the hybrid disc is determined, the content data of the byte position "13" field includes ID information of the hybrid disc types. And, the above-mentioned content data also includes information of the channel bit length.

For example, if the above-mentioned content data is defined by 1 byte, the MSB 2 bits (b7~b6) of a single byte are firstly assigned to indicate a current status of a DVD layer. In more detail, if the MSB 2 bits (b7~b6) are "00", this means that there is no DVD layer. If the MSB 2 bits (b7~b6) are "01", this means that there is a DVD-ROM type layer. If the MSB 2 bits (b7~b6) are "10", this means that there is a DVD-R type layer. If the MSB 2 bits (b7~b6) are "11", this means that there is a DVD-RW type layer.

If the MSB 2 bits (b7~b6) are "00", there is no DVD layer, such that this means that there is no BD-DVD hybrid disc. However, two bits other than the above-mentioned "00" case is indicative of the BD-DVD hybrid disc case, such that the DVD layer type is defined in the above-mentioned hybrid disc.

Thereafter, the next two bits (b5~b4) are assigned to indicate a current status of the CD layer. In more detail, if the 2 bits (b5~b4) are "00", this means that there is no CD layer. If the 2 bits (b5☐b4) are "01", this means that there is a CD-ROM type layer. If the 2 bits (b5☐b4) are "10", this means that there is a CD-R type layer. If the 2 bits (b5☐b4) are "11", this means that there is a CD-RW type layer.

If the 2 bits (b5☐b4) are "00", there is no CD layer, such that this means that there is no BD-CD hybrid disc. However, two bits other than the above-mentioned "00" case is indicative of the BD-CD hybrid disc case, such that the CD-type is defined in the above-mentioned disc.

The remaining 4 bits (b3☐b0) indicate the channel bit length. The channel bit is the smallest element expressed by marks and spaces on the disc composed of binary values "0" and "1".

As described above, a current status of the DVD layer and a current status of the CD layer are defined by the upper 4 bits (b7☐b4) from among a single byte of the byte position "13" field, such that it is possible to discriminate the BD-DVD-CD hybrid disc from others.

In association with the above-mentioned description, if the above-mentioned upper 4 bits are expressed by the remaining values other than the value "00", it can be recognized that the disc is the BD-DVD-CD hybrid disc. Therefore, format and type of the above-mentioned hybrid disc can be recognized.

However, it is impossible to recognize how many layers are contained in each format of the hybrid disc using only the above-mentioned information. In more detail, the configuration formats of the above-mentioned hybrid disc can be discriminated by the above-mentioned information, however, it is impossible to recognize how many layers are contained in the above-mentioned configuration format.

Therefore, in order to correctly define the above-mentioned hybrid disc, not only the above-mentioned information, but also other information indicating the number of layers contained in each format of the hybrid disc is required.

In association with the above-mentioned description, the byte position "15", field is "Number of Total Layer" content data, and 1 byte is assigned for the content data. The above-mentioned field indicates the number of layers of each format contained in the hybrid disc.

In the case of using information of the above-mentioned field, individual formats of the hybrid disc can be discriminated from each other in the same manner as in the above-mentioned byte position "13" field information, and information indicating the number of layers of each format can also be acquired.

In other words, the byte position "15" field information indicates the number of layers of each format used for constructing the hybrid disc. The byte position "15" field includes a total of 8 bits from an MSB "b7" to an LSB (Least Significant Bit) "b0".

In this case, three bits (b7☐b5) from among the 8 bits are used to define the number of BD layers used for the disc. The BD is able to include a maximum of 8 layers, such that 3 bits are assigned to express all the aforementioned layers.

A predetermined 1 bit (b4) defines the number of CD layers used for the disc. 1 bit is assigned to express the number of CD layers, such that it can indicate a double-layered CD structure.

Predetermined 2 bits (b3☐b2) define the number of DVD layers used for the disc. 2 bits are assigned to express the number of DVD layers, such that it can indicate a DVD layer composed of 4 layers.

Predetermined 2 bits (b1☐b0) act as reserved areas, such that the reserved areas are assigned for another hybrid disc which can be developed in the future. For example, the above-mentioned 2 bits (b1☐b0) are assigned in consideration of either a hybrid disc acquired by the combination of the BD and the HD-DVD or another hybrid disc acquired by the combination of other standard discs.

For example, if a single byte of the byte position "15" field information is recorded with "100 0 11 00", 3 bits "100" from the MSB is equal to "4", such that this means that the number of BD layers is "4". And, the next 1 bit is "0", such that there is no CD layer. Furthermore, the next 2 bits are "11", it can be recognized that the number of DVD layers is "3".

In brief, the BD includes 4 layers, the CD includes 0 layer, and the DVD includes 3 layers, such that the above-mentioned disc is determined to be BD-DVD hybrid disc.

The above-mentioned description has disclosed a method for recording information indicating the number of layers of each format contained in the hybrid disc according to the present invention using the assignment of the above-mentioned 1 byte (i.e., 8 bits). In this case, the byte position or the number of bytes is freely defined for the convenience of description and better understanding of the present invention.

Therefore, if the byte position or the number of bytes is defined as described above, a drive may read data of a byte corresponding to the byte position "15" field, such that it can determine whether a current disc is a hybrid disc, can recognize constituent format of the determined hybrid disc, and can recognize how many BD, DVD, or CD layers are contained in each format. Type of each format may be recognized by the above-mentioned byte position "13" field.

In association with the above-mentioned description, in the case of the BD-format having different types as shown in FIG. 1A, the above-mentioned disc information (DI) records the same DI as the above-mentioned description in all the layers of individual types. In the case of the hybrid disc composed of several formats, the BD format firstly meets the optical-beam incident surface, such that corresponding DI is recorded in the BD layer.

Therefore, according to the present invention, a user or drive can easily recognize the presence or absence of the hybrid disc and format and type of the hybrid disc.

The above-mentioned description shows an example of a management area, and has disclosed the DI of the PIC area. In association with the above-mentioned description, the DI may also be recorded in the BCA area of FIG. 2A.

As described above, in order to record/reproduce data in/from the hybrid disc, correct and rapid information associated with the above-mentioned disc is required. In this case, if the DI is recorded in the BCA area, the disc can be rapidly initialized. If the DI is recorded in not only the BCA area but also the PIC area, it is possible to discriminate the hybrid disc from others even if unexpected errors or faulty operations occur.

The byte position "16" field of FIG. 2B is "BCA descriptor" content data, and 1 byte is assigned to the byte position "16" field. The byte position "16" field indicates information recorded in the BCA area. If the BCA area is used as the management area, the DI should be recorded in the byte position "16" field.

In this case, the BCA area is defined by an application, and is mainly used to add desired information to the disc after the manufacturing process is completed.

In association with the above-mentioned description, in the case of the BD-R disc, the BCA area code is written by a High-Power Laser System. Information contained in the BCA area may be read by the drive at all radius points of the BCA area.

In order to quickly perform the starting-up of the hybrid disc, it is essential to quickly recognize type of the disc as soon as possible. Therefore, data of the BCA area must be firstly read when the disc is seated in the drive, such that information pieces associated with the hybrid disc distinction methods according to the present invention are inserted into the BCA area.

If the drive can firstly read DI of the disc inserted into the BCA area, the optical recording/reproducing device can recognize disc type without completely reading all DI, such that it can more quickly execute the initial set-up of the disc.

An apparatus for recording/reproducing data in/from the hybrid disc according to another preferred embodiment of the present invention will hereinafter be described with reference to FIG. 3.

Figure 3:
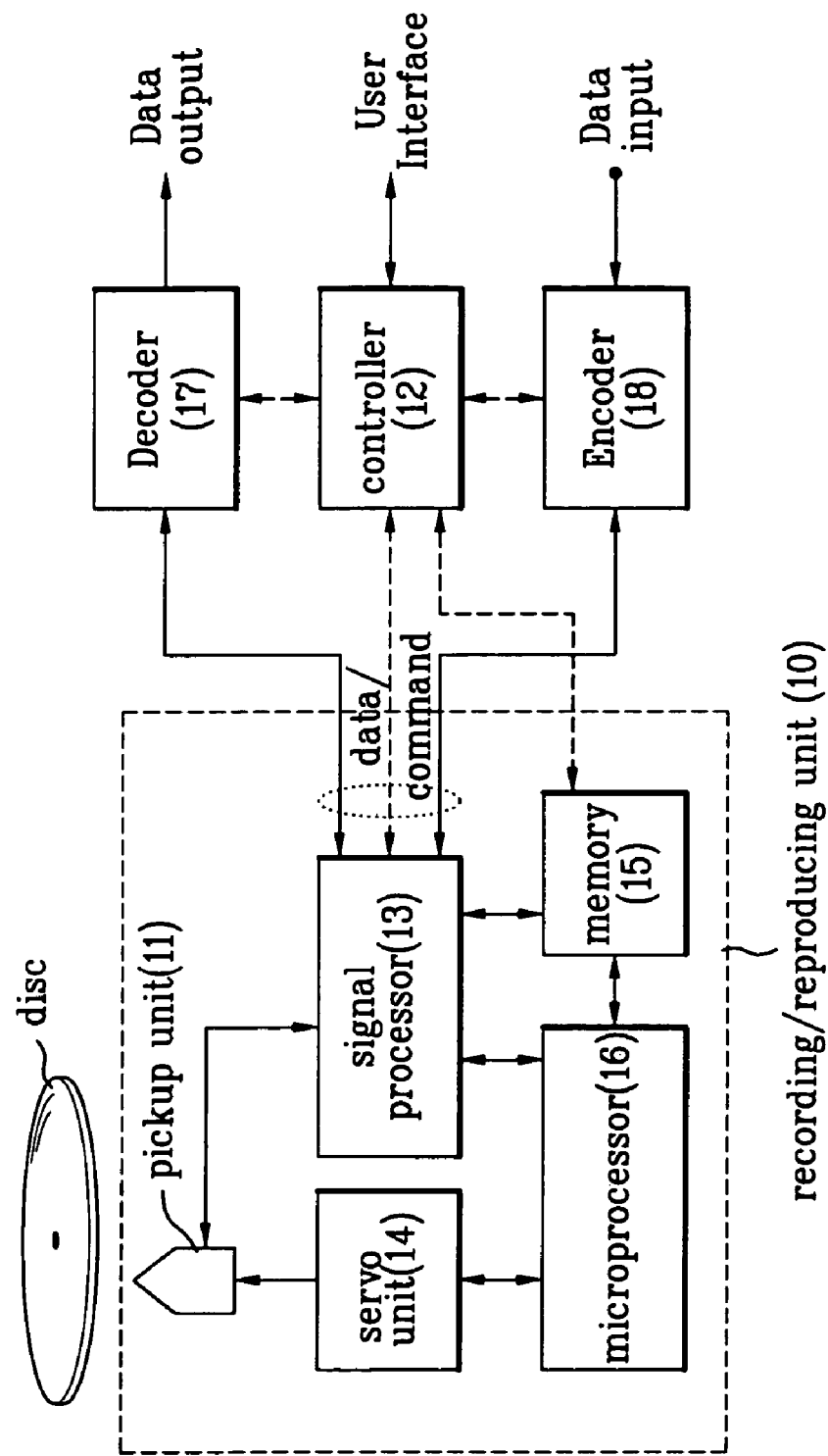
FIG. 3 is a block diagram illustrating an apparatus for recording/reproducing data in/from a recording medium according to the present invention.

FIG. 3 is a block diagram illustrating an apparatus for recording/reproducing data in/from a recording medium according to the present invention.

Referring to FIG. 3, an apparatus for recording/reproducing data in/from a recording medium includes a recording/reproducing unit 10 for recording/reproducing data in/from a disc, and a controller 12 for controlling the recording/reproducing unit 10.

The recording/reproducing unit 10 includes a pickup unit 11, a signal processor 13, a servo unit 14, a memory 15, and a microprocessor 16. The pickup unit 11 directly records data in the disc, or reads data recorded in the disc. The signal processor 13 receives a signal read from the pickup unit 11, restores the received signal to a desired signal value, or modulates a signal to be recorded into another signal recorded in the disc, such that it transmits the recovered or modulated result. The servo unit 14 controls operations of the pickup unit 11, such that it correctly reads a desired signal from the disc, and correctly records the signal in the disc. The memory 15 temporarily stores not only management information but also data. The microprocessor 16 controls overall operations of the above-mentioned components.

The microprocessor 16 discriminates the hybrid disc from others using format and type of the hybrid disc from among the management information, such that it reproduces data of the hybrid disc. Otherwise, the microprocessor discriminates the hybrid disc from others using specific information indicating the format and type of the hybrid disc from among the management information, such that it records data in the hybrid disc.

The recording/reproducing unit 10 records data in the recording medium. In association with the above-mentioned description, the recording device composed of only the recording/reproducing unit 10 is referred to as a drive, and is generally used as a peripheral device of a computer.

The controller 12 controls operations of overall constituent components. In association with the present invention, the controller 12 refers to a user command by interfacing with a user, and transmits a recording/reproducing command capable of recording/reproducing data in/from the disc to the recording/reproducing unit 10.

In association with the preset invention, the functions of the controller 12 and the microprocessor 16 can be separated and operated by a first control unit and a second control unit, respectively. Alternatively, the functions of the controller 12 and the microprocessor 16 can be combined and operated as a single control unit.

The decoder 17 decodes a signal read from the disc upon receiving a control signal from the controller 12, restores the decoded signal to desired information, and transmits the restored signal to the user.

The encoder 18 receives a control signal from the controller 12 to record a desired signal in the disc, converts the received signal into a specific-format signal (e.g., an MPEG2 transport stream), and transmits the specific-format signal to the signal processor 13.

As described above, all the constituent components of the apparatus for recording/reproducing data in/from the recording medium are depicted in FIG. 3. Firstly, in association with a data playback (or reproducing) operation, the recording medium, and the recording/reproducing unit 10, and the decoder 17 will be used for the data playback operation. Secondly, in association with a data record operation, the recording medium, the recording/reproducing unit 10, and the encoder 18 will be used according to a control signal of the controller 12.

A method for recording/reproducing data in/from the recording medium using the apparatus shown in FIG. 3 will hereinafter be described with reference to FIG. 4.

Figure 4:
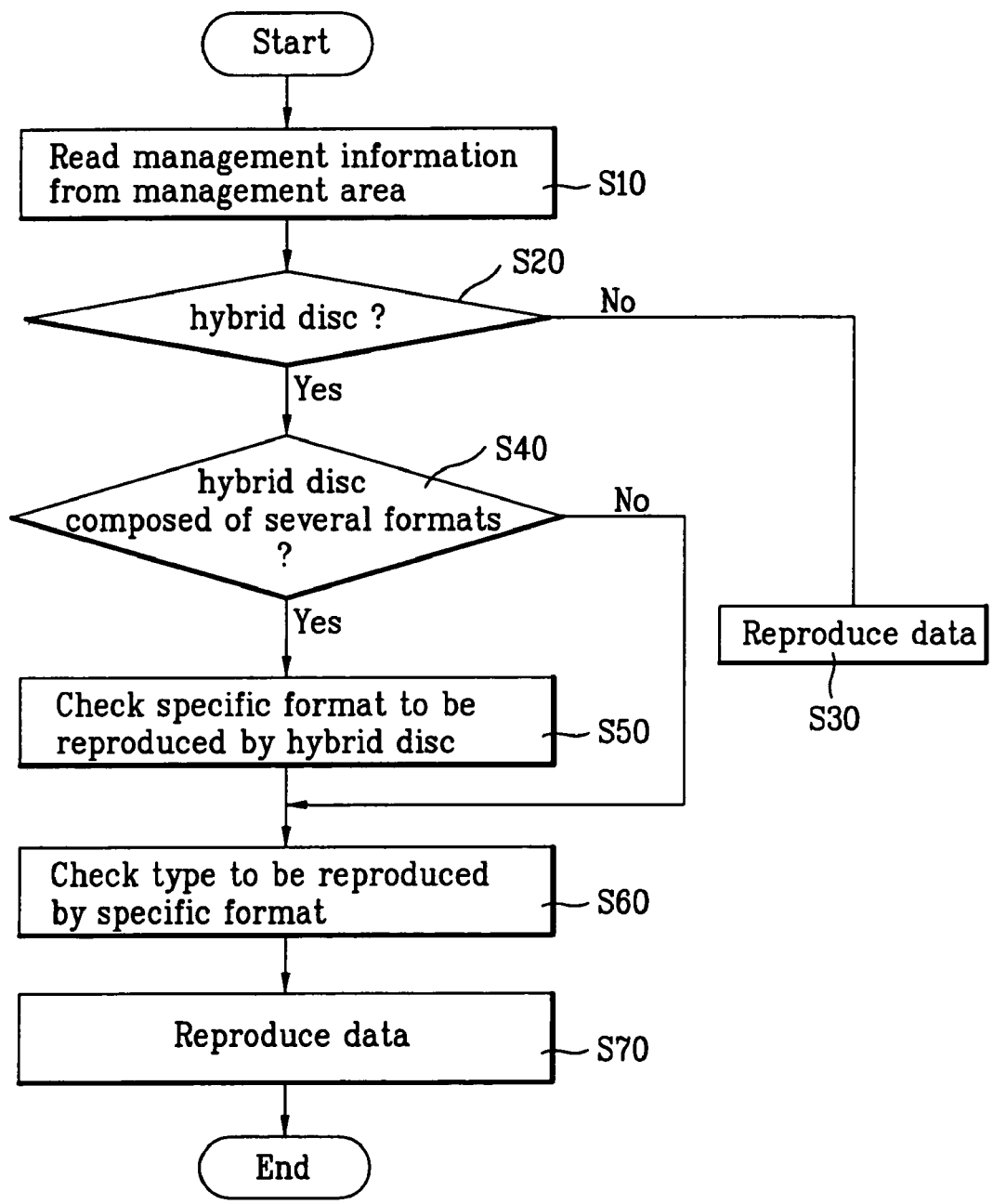
FIG. 4 is a flow chart illustrating a method for reproducing data from a hybrid disc according to the present invention.

FIG. 4 is a flow chart illustrating a method for reproducing data from a hybrid disc according to the present invention.

Referring to FIG. 4, in order to reproduce data from the recording medium, management information is read from the management area of the recording medium at step S10. In this case, the management information includes specific information indicating a presence of different format and type of the recording layer in the recording medium, and other information indicating the number of layers of the recording medium.

It is determined whether the recording medium is a hybrid disc using the management information at step S20. If it is determined that the recording medium is not equal to the hybrid disc at step S20, data of the recording medium is reproduced at step S30.

If it is determined that the recording medium is equal to the hybrid disc at step S20, it is determined whether a current recording medium is a hybrid disc composed of several formats at step S40.

If it is determined that the current recording medium is the hybrid disc composed of several formats at step S40, a specific format to be reproduced by the hybrid disc is checked at step S50.

After checking the above-mentioned specific format at step S50, type of the specific format to be reproduced by the hybrid disc is checked at step S60.

If the type of the specific format to be reproduced by the hybrid disc is checked at step S60, data is reproduced according to the above-mentioned type at step S70.

Also, if the recording medium is not equal to the hybrid disc composed of several formats at step S40, type of a specific format to be reproduced by the hybrid disc is checked at step S60.

For example, if the format is checked as CD at the step S50, a demodulation method (i.e. 14-8 demodulation) and optical system related to CD are applied to reproduce a CD layer at the step S70, and if the format is checked as DVD, a demodulation method (i.e. 16-8 demodulation) and optical system related to DVD are applied to reproduce a DVD layer. Furthermore, if type is checked as one of CD-ROM, CD-R and CD-RW, one of DVD-ROM, DVD write once and DVD rewritable at the step S50 and S60, a reproducing method related to each type further is applied to the corresponding layer.

Figure 5:
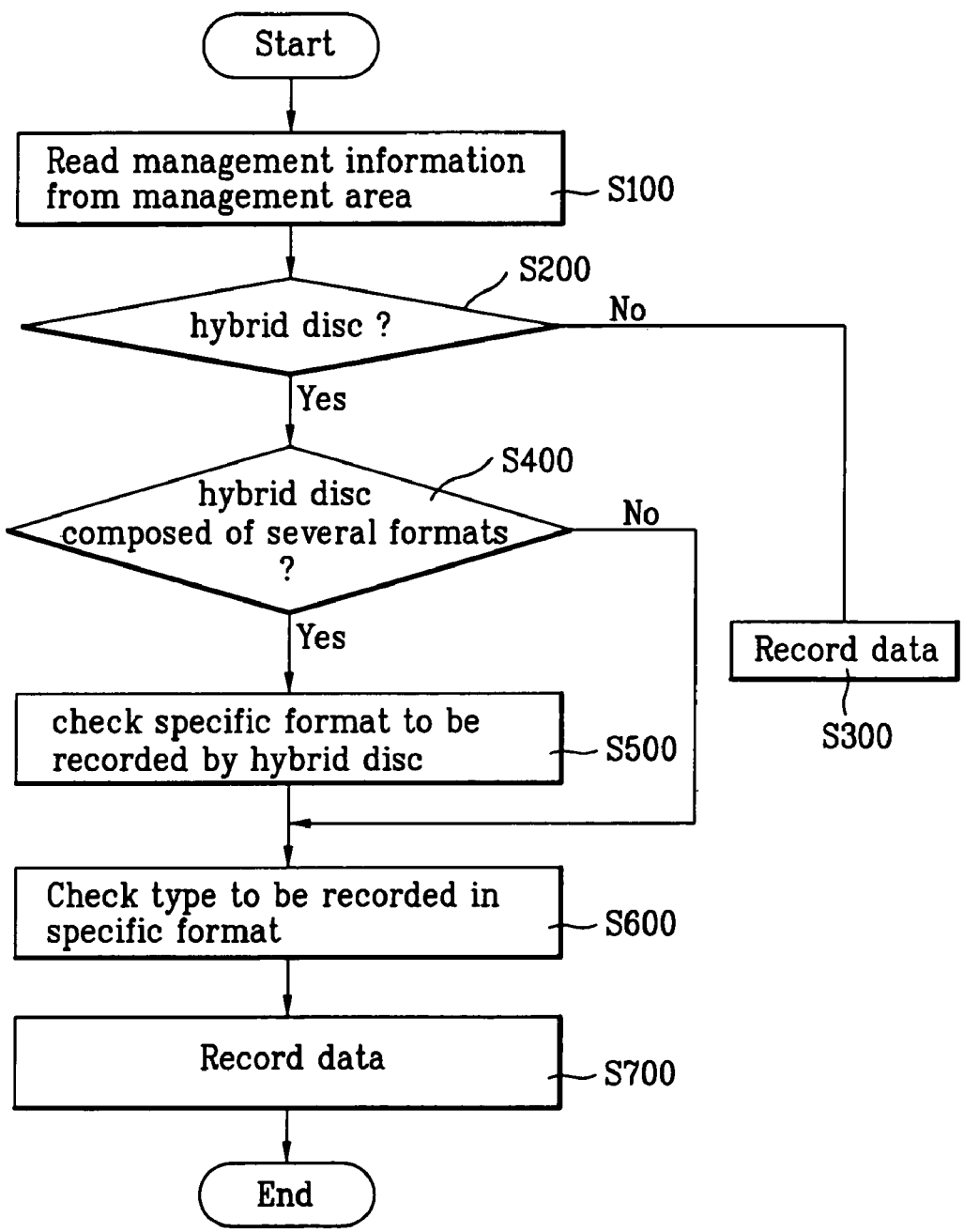
FIG. 5 is a flow chart illustrating a method for recording data in a hybrid disc according to the present invention.

FIG. 5 is a flow chart illustrating a method for recording data in a hybrid disc according to the present invention.

Compared with the method for reproducing data from the hybrid disc in FIG. 4, the difference between the method for recording data in the hybrid disc in FIG. 5 and the method for reproducing data from the hybrid disc in FIG. 4 is that data is recorded in specific steps S300, S500, S600, and S700, such that a detailed description of FIG. 5 will herein be omitted for the convenience of description.

For example, if the format is checked as CD at the step S500, a modulation method (i.e. 8-14 modulation) and optical system related to CD are applied to record data in a CD layer at the step S700, and if the format is checked as DVD, a modulation method (i.e. 8-16 modulation) and optical system related to DVD are applied to record data in the DVD layer. Furthermore, if type is checked as one of CD-ROM, CD-R and CD-RW, one of DVD-ROM, DVD write once and DVD rewritable at the step S500 and S600, a recording method related to each type further is applied to the corresponding layer. As apparent from the above description, a recording medium, and a method and apparatus for recording/reproducing data in/from the recording medium according to the present invention can determine whether a current recording medium is a hybrid disc, and can recognize format- and type-information of the determined hybrid disc.

Also, the present invention can recognize type of the recording medium without completely reading information of all the recording mediums, resulting in reduction of an initial setup time of the recording medium.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An optical disc comprising:
   a first recording layer of a first format; and
   a second recording layer of a second format that is different from the first format,
   wherein at least one of the first and second recording layers includes a management area storing management information including,
      first information indicating a number of layers of each of the first and second formats;
      second information indicating whether the optical disc is a hybrid disc; and
      third information indicating a type of each of the first and second recording layers, the type being one of a read-only layer, a write-once layer and a rewritable layer.

2. The optical disc of claim 1, wherein the second format is one of a CD format and a DVD format.

3. The optical disc of claim 1, wherein the first format is a BD format.

4. The optical disc of claim 3, wherein the management area is located on the first recording layer.

5. The optical disc of claim 4, wherein the management area is a PIC (Permanent Information & Control data) area.

6. The optical disc of claim 4, wherein the management area is a BCA (Burst Cutting Area).

7. The optical disc of claim 4, wherein the second recording layer is located at a higher portion than the first recording layer in the optical disc.

8. The optical disc of claim 1, wherein the third information includes information indicating whether each of the first and second recording layers is the read-only layer or a writable layer and information indicating whether each of the first and second recording layers is the write-once layer or the rewritable layer.

9. The optical disc of claim 8, wherein the first information includes a first field indicating a number of layers of the first format and a second field indicating a number of layers of the second format.

10. The optical disc of claim 1, wherein the type of the first recording layer is one of a BD-ROM (Read Only Memory) type, a BD-R (Recordable) type, and a BD-RE (Rewritable) type.

11. The optical disc of claim 1, wherein the type of the second recording layer is one of a CD-ROM (Read Only Memory) type, a CD-R (Recordable) type, and a CD-RW (Rewritable) type.

12. The optical disc of claim 1, wherein the type of the second recording layer is one of a DVD-ROM (Read Only Memory) type, a DVD Write once type, and a DVD Rewritable type.

13. A method for reproducing data from a recording medium, the method comprising:
   reading management information for indicating formats and types of a first recording layer of a first format and a second recording layer of a second format that is different from the first format from a management area of the recording medium, wherein the management information includes,
      first information indicating a number of layers of each of the first and second formats;
      second information indicating whether the recording medium is a hybrid disc; and
      third information indicating a type of each of the first and second recording layers, the type being one of a read-only layer, a write-once layer and a rewritable layer; and
   determining a reproducing mode to reproduce data from at least one of the first and second recording layers based on the management information.

14. The method of claim 13, wherein the management area is located at a lower portion among the first and second recording layers.

15. The method of claim 13, wherein the second format is a CD format.

16. The method of claim 13, wherein the second format is a DVD format.

17. A method for recording data in a recording medium, the method comprising:
   reading management information for indicating formats and types from a management area of the recording medium, the recording medium including a first recording layer of a first format and a second recording layer of a second format that is different from the first format, wherein the management information includes,
      first information indicating a number of layers of each of the first and second formats;
      second information indicating whether the recording medium is a hybrid disc; and
      third information indicating a type of each of the first and second recording layers, the type being one of a read-only layer, a write-once layer and a rewritable layer; and
   determining a recording mode to record data on at least one of the first and second recording layers based on the management information.

18. The method of claim 17, wherein the management area is located at a lower layer among the first and second recording layers.

19. The method of claim 17, wherein the second format is a CD format.

20. The method of claim 17, wherein the second format is a DVD format.

21. An apparatus for recording/reproducing data on/from a recording medium, the apparatus comprising:
   a pickup unit configured to record/reproduce data on/from the recording medium which includes a first recording layer of a first format and a second recording layer of a second format that is different from the first format;

a control unit configured to control the pickup unit to read management information for indicating formats and types of the first and second recording layers from a management area of the recording medium, wherein the management information includes,
  first information indicating a number of layers of each of the first and second formats;
  second information indicating whether the recording medium is a hybrid disc; and
  third information indicating a type of each of the first recording layer and second recording layer, the type being one of a read-only layer, a write-once layer and a rewritable layer,
wherein the control unit is configured to determine a recording/reproducing mode to record/reproduce data on/from at least one of the first and second recording layers based on the management information; and
a processor configured to process data based on the determined recording/reproducing mode.

22. The apparatus of claim 21, wherein the control unit is configured to read the management information from a recording layer nearer to a surface of the recording medium among the first and second recording layers.

23. The apparatus of claim 21, wherein the second format is a CD format.

24. The apparatus of claim 21, wherein the second format is a DVD format.

25. The optical disc of claim 1, further comprising:
a third recording layer of a third format that is different from the first and second formats, wherein the first information further indicates a number of layers of the third format, the third information further indicates the type of the third recording layer, the type of the third recording layer being one of the read-only layer, the write-once layer and the rewritable layer.

26. The method of claim 13, wherein the recording medium further includes a third recording layer of a third format that is different from the first and second formats, wherein first information further indicates a number of layers of the third format, the third information further indicates the type of the third recording layer, the type of the third recording layer being one of the read-only layer, the write-once layer and the rewritable layer.

27. The method of claim 17, wherein the recording medium further includes a third recording layer of a third format that is different from the first and second formats, wherein first information further indicates a number of layers of the third format, the third information further indicates the type of the third recording layer, the type of the third recording layer being one of the read-only layer, the write-once layer and the rewritable layer.

28. The apparatus of claim 21, wherein the recording medium further includes a third recording layer of a third format that is different from the first and second formats, wherein first information further indicates a number of layers of the third format, the third information further indicates the type of the third recording layer, the type of the third recording layer being one of the read-only layer, the write-once layer and the rewritable layer.

29. The method of claim 13, wherein the third information includes information indicating whether each of the first and second recording layers is the read-only layer or a writable layer and information indicating whether each of the first and second recording layers is the write-once layer or the rewritable layer.

30. The method of claim 17, wherein the third information includes information indicating whether each of the first and second recording layers is the read-only layer or a writable layer and information indicating whether each of the first and second recording layers is the write-once layer or the rewritable layer.

31. The apparatus of claim 21, wherein the third information includes information indicating whether each of the first and second recording layers is the read-only layer or a writable layer and information indicating whether each of the first and second recording layers is the write-once layer or the rewritable layer.

* * * * *